Patented Sept. 2, 1952

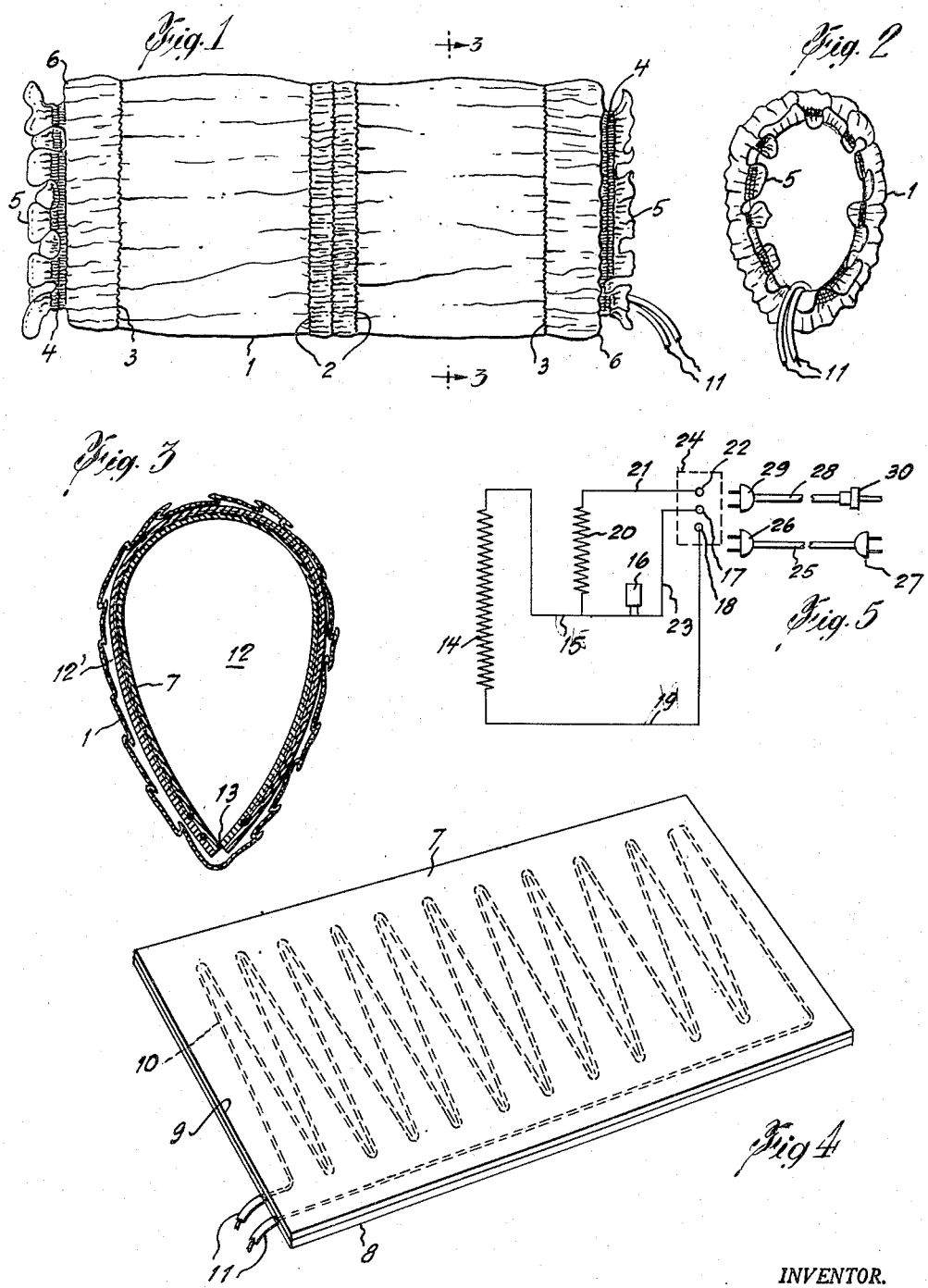

2,609,479

UNITED STATES PATENT OFFICE 2,609,479

FLEXIBLE ELECTRIC HEATER

Paul Loewe, Mexico City, Mexico

Application November 16, 1950, Serial No. 195,995
In Mexico June 27, 1950

8 Claims. (Cl. 219—46)

The present application is directed to a flexible electric heater for liquids, more particularly one which is adapted for heating or warming bottles, glasses and other containers having substances therein such as foods.

It is common practice to warm foods, particularly for infants or invalids, in small containers, as for example, milk in baby bottles. Various devices for warming such bottles have been used, such as by providing hot water and immersing the bottles in such water. However, this has disadvantages in that it is necessary to heat a relatively large volume of water, the operation is messy because of danger of spilling water, and the temperature of the milk cannot be accurately gauged.

There has also been used an electrical heating device consisting essentially of a container of ceramic material, having a pair of electrodes in the bottom thereof beneath a shelf or false bottom. Water was introduced into the lower part of the container whereby a circuit was completed between the electrodes, heating the water to a suitable temperature, usually near the boiling point. The bottle of milk was placed on the shelf and the contact with the water or the vapor arising therefrom heated the bottle. However, this also had a number of disadvantages in that it required the use of water and often the water level became so low that current ceased flowing and the bottle was not adequately heated. The device was rigid and bulky and could not be stored in a small space. Because of the use of ceramic material, it was subject to breakage by ordinary or careless handling, and since the size thereof was fixed, only containers of certain sizes could be introduced into the same.

The present invention is intended and adapted to overcome the difficulties and disadvantages inherent in devices of the type described, it being among the objects of the present invention to provide an electrical heating device of such construction that a container of liquid or other material is adapted to be placed in contact therewith and be directly heated.

It is also among the objects of the present invention to provide a device of the character described which is flexible and which may be placed in direct contact with the container regardless of the size or shape thereof, whereby direct transmission of heat from the source through the container and into the material held therein is attained.

It is further among the objects of the present invention to provide a device in which a small and controlled amount of electricity is utilized so that it may be used with various voltages and may be adapted for house current as well as for automobile current.

In practicing the present invention, there is provided a thin, flexible, flat pad containing an electrical heating element. Preferably the pad is rectangular and it is made of flexible insulating material such as rubber or synthetic plastics. The heating element is usually of zigzag form held between covering sheets of rubber or the like. There is also provided a covering sleeve of textile fabric, usually woven, the diameter of the sleeve being substantially greater than the diameter of the pad or electrical heater when rolled into a cylinder with the edges thereof in substantial contact. Transversely across the sleeve in the central portion thereof are a number of lines of stitching with elastic thread stitched under tension. In addition, there are similar lines of stitching at both ends of the sleeve. The length of the sleeve is somewhat greater than the length of the cylindrical heater.

The heating pad is inserted into the sleeve, the ends thereof being contracted over the ends of the pad so as to hold it securely in position therein. Due to the several lines of transverse stitching, folds are formed, leaving air spaces between the sleeve and the pad, acting as an insulator to confine the heat within the pad. The bottle or other container to be heated is slipped into the cylindrical pad and is retained in position by the elasticity of the transverse threads of the sleeve. If the container is quite small, the pad may be rolled so that the ends thereof overlap and it contacts the container around its entire periphery. The sleeve will automatically contract due to the elastic threads to hold the bottle and pad in position.

There are numerous advantages inherent in the present invention which render the device highly effective for the desired purpose. The device is flexible as a whole and can be folded. Therefore, it is readily packed for storage or for transportation and there is nothing that can be broken even by careless handling. It is light in weight and may be made waterproof so that it is not affected by liquids that might be accidentally spilled. It is economical and efficient in its operation since it uses a minimum of electricity and it may be adapted for use with containers of any form. As a result, it is unnecessary to handle liquids or of transferring liquids from one container into another.

In the accompanying drawing constituting a part hereof and in which like reference characters indicate like parts, Fig. 1 is a side elevational view of a flexible electrical heating device made in accordance with the present invention;

Fig. 2 is an end elevational view thereof;

Fig. 3 is a transverse cross-sectional view taken along line 3—3 of Fig. 1;

Fig. 4 is a perspective view of the heating element removed from the sleeve and showing the arrangement thereof, and Fig. 5 is a wiring diagram of a slightly modified form of heating arrangement.

There is provided a sleeve 1 of suitable thin flexible material such as textiles, plastics, oil cloth, rubber or other substances usually used in the textile industry. Around the central portion of the sleeve are a series of fairly closely spaced parallel lines of stitching 2 made with elastic threads under tension so that upon the release of the tension, a puckering of the fabric takes place. Additional lines of similar stitching 3 are provided near the ends of sleeve 1. At the ends of said sleeve are several closely spaced lines of stitching 4 made in a similar manner with elastic thread under tension. A heating element is inserted within the sleeve so that it is positioned centrally thereof and assumes a cylindrical or oval form. Due to the tension of the lines of stitching 4, the ends 5 of sleeve 1 are contracted so as to overlap the ends of the heating element, forming shoulders 6.

As shown in Fig. 4, the heating element 7 consists of two flat flexible members 8 and 9, usually made of a soft material such as vulcanized rubber, synthetic rubber or plastics. Between elements 8 and 9 is a zig-zag wire 10, the ends 11 thereof extending out of one corner of the heating pad 7.

When the pad is within the sleeve as shown in Figs. 1 to 3, there is a space 12 within the pad which normally assumes a position with the ends 13 thereof in contact due to the flexibility of pad 7 and the tension of threads 2 and 3. When a bottle or other container is to be heated, it is slipped into one end of the sleeve into space 12 and if the container is of a larger diameter than the space, heating element 7 is correspondingly expanded against the tension of the elastic threads. This causes the heating element to fit closely to the container, giving direct transmission of heat. At the same time, a series of air spaces 12' are formed between element 7 and sleeve 1, forming an insulating dead air space which minimizes loss of heat.

Referring to Fig. 5, the wire 14 constituting the heating element is connected to wire 15 and thermostatic regulator 16 to terminal 17 of a pair of terminals, wherein the other terminal 18 is connected by wire 19 to the opposite end of element 14. A second circuit is provided by resistor element 20, having one end connected through wire 21 to terminal 22 and the other wire 23 connected to terminal 17. All three terminals are contained within a suitable casing 24.

This provides a system which may be utilized on two different voltages. For instance, if the element is to be connected to a house circuit, there is provided a cord 25 having a plug 26 adapted to be inserted into terminals 17—18. The other end of the cord is provided with plug 27 to be inserted into the house circuit. If the device is to be used in connection with an automobile circuit, a cord 28 is provided with plug 29 adapted to be inserted into terminals 17—22. At the other end of cord 28 is an element 30 similar to the ordinary cigarette lighter provided in a car and adapted to be inserted in place thereof for connection to the battery of the car.

Among the advantages of the device is the fact that it is open at top and bottom and, therefore, the container to be warmed can be introduced or removed without the necessity of manipulating strings or other attachments. Because the device is open at the top, the liquid or other material in the container may be handled during the heating period. If a baby bottle is being warmed, the heating may be continued while the baby is drinking, to avoid excessive cooling of the milk. If a container of more or less solid food is being warmed, the container may be opened and the contents may be stirred while being heated.

The device adjusts itself automatically not only to bottles but other containers such as cans, tumblers and the like. Because of the direct contact between the heating element and the container, the heating time is greatly shortened. Since the heating pad is waterproof, spilling of liquid thereon will not cause any damage and no short circuits or danger to the user can develop.

Although the invention has been described setting forth a single specific embodiment thereof, various changes may be made in the details within the scope of the invention. For instance, various electrical circuits for different voltages may be incorporated in a single heating element to take care of such voltages, as for example from 6 to 220. The heating element may be covered with suitable materials such as natural or synthetic rubber and may contain fabric or fibers to strengthen it. The resistor wire may be first mounted on a suitable carrier and then the cover sheets cemented or otherwise secured over the element such as by sewing, vulcanizing and the like. The form of the resistor may be changed and a separate set of terminals may be provided for different voltages.

The sleeve may be of any suitable material such as cotton, silk, synthetic fibers, sheet plastic or oil cloth. It may be woven, knitted or felted and may be waterproofed and flame-proofed.

These and other changes may be made in the details without departing from the principles herein set forth and the invention is, therefore, to be broadly construed and not to be limited except by the character of the claims appended hereto.

I claim:

1. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end.

2. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end, the elasticity of said stitching being sufficient so that said sleeve frictionally engages the face of said cylinder.

3. An electric heater comprising a flexible, thin cylindrical body split along a longitudinal line, a conductive wire within said body, said body being of a resilient rubbery material, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end.

4. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, said transverse stitching including a plurality of closely spaced stitches at the central part of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end.

5. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around both of the ends of said sleeve, said cylinder being detached from and within said sleeve, the diameter of said sleeve when expanded being greater than the diameter of said cylinder, said sleeve ends covering the adjacent ends of said cylinder to retain the latter in position, said wire ends extending out of a sleeve end.

6. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end, said sleeve being of water-repellant material.

7. An electric heater comprising a flexible, thin cylindrical body split along a longitudinal line, a conductive wire with said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end, said wire including a plurality of resistors having one common terminal wire and a pair of separate terminal wires, two terminals for connection to a source of current for said resistors respectively and having said common wire attached thereto, said resistors adapted to function with a plurality of voltages of said current source.

8. An electric heater comprising a flexible, thin cylindrical body split along a longitudinal line, a conductive wire within said body, the ends of said wire extending from the end of said cylinder, means on said wire ends for connection to a source of current, a cylindrical sleeve of flexible textile fabric open at at least one end thereof, lines of transverse elastic stitching around the central portion of said sleeve, elastic stitching around said end of said sleeve, said cylinder being detached from and within said sleeve, the diameter of said sleeve when expanded being greater than the diameter of said cylinder, said sleeve end covering the adjacent end of said cylinder to retain the latter in position, said wire ends extending out of a sleeve end, and a thermostat in the circuit of said wire to break the circuit at predetermined temperatures.

PAUL LOEWE.

REFERENCES CITED

The following references are of record in the file of this patent:

UNITED STATES PATENTS

| Number | Name | Date |
|---|---|---|
| 1,455,287 | Hadley | May 15, 1923 |
| 1,657,479 | MacFarland | Jan. 31, 1928 |
| 1,992,593 | Whitney | Feb. 26, 1935 |
| 2,120,301 | Tishman | June 14, 1938 |
| 2,298,298 | Joy et al. | Oct. 13, 1942 |
| 2,516,637 | McCollum | July 25, 1950 |
| 2,526,447 | Aiken | Oct. 17, 1950 |